United States Patent
Homma (10) Patent No.: US 8,259,650 B2
(45) Date of Patent: Sep. 4, 2012

(54) COMMUNICATION DEVICE CONNECTABLE TO AN ACCESS POINT BASED ON SETTING INFORMATION WIRELESSLY PROVIDED FROM ANOTHER DEVICE, A SYSTEM HAVING SUCH COMMUNICATION DEVICE, AND A METHOD UTILIZING SUCH COMMUNICATION DEVICE

(75) Inventor: Fuminori Homma, Tokyo (JP)

(73) Assignee: Sony Corporation (JP)

( * ) Notice: Subject to any disclaimer, the term of this patent is extended or adjusted under 35 U.S.C. 154(b) by 679 days.

(21) Appl. No.: 12/283,603

(22) Filed: Sep. 12, 2008

(65) Prior Publication Data

US 2009/0073923 A1    Mar. 19, 2009

(30) Foreign Application Priority Data

Sep. 14, 2007 (JP) ................ P2007-239312

(51) Int. Cl.
*H04W 4/00* (2009.01)
(52) U.S. Cl. .................. 370/328; 455/74; 709/228
(58) Field of Classification Search .......... None
See application file for complete search history.

(56) References Cited

U.S. PATENT DOCUMENTS

| | | | |
|---|---|---|---|
| 2005/0078624 A1* | 4/2005 | Shu et al. | 370/328 |
| 2005/0130647 A1* | 6/2005 | Matsuda et al. | 455/426.2 |
| 2005/0181778 A1 | 8/2005 | Sugi | |
| 2005/0192011 A1* | 9/2005 | Hong et al. | 455/440 |
| 2007/0028103 A1 | 2/2007 | Sugi | |
| 2007/0060110 A1 | 3/2007 | Sugi | |

FOREIGN PATENT DOCUMENTS

| | | |
|---|---|---|
| JP | 2003-143156 A | 5/2003 |
| JP | 2005-210314 A | 8/2005 |
| JP | 2007-036733 A | 2/2007 |
| JP | 2007-036734 A | 2/2007 |
| JP | 2007-074556 A | 3/2007 |

* cited by examiner

*Primary Examiner* — Yemane Mesfin
*Assistant Examiner* — Khoa Huynh
(74) *Attorney, Agent, or Firm* — Lerner, David, Littenberg, Krumholz & Mentlik, LLP

(57) ABSTRACT

A communication device is disclosed. The communication device includes a radio communication section and a switching section. The switching section switches a function between a station function and an access point function. In a state that the function of the communication device has been switched to the access point function, the communication device is connected to another communication device contained in a radio communication network through the radio communication section. The communication device receives connection setting information from the other communication device through the communication section. The connection setting information has been set to the communication section. The communication device stores the received connection setting information. After the function of the communication device has been switched from the access point function to the station function, the communication device is connected to the radio communication network containing the other communication device based on the stored connection setting information.

16 Claims, 6 Drawing Sheets

COMMUNICATION DEVICE CONNECTABLE TO AN ACCESS POINT BASED ON SETTING INFORMATION WIRELESSLY PROVIDED FROM ANOTHER DEVICE, A SYSTEM HAVING SUCH COMMUNICATION DEVICE, AND A METHOD UTILIZING SUCH COMMUNICATION DEVICE

CROSS REFERENCES CROSS-REFERENCE TO RELATED APPLICATIONS

The present application claims priority from Japanese Patent Application No. JP 2007-239312, filed in the Japanese Patent Office on Sep. 14, 2007, the entire contents of which is incorporated herein by reference.

BACKGROUND OF THE INVENTION

1. Field of the Invention

The present invention relates to a communication device having a radio communication function, a communication system thereof, and a communication setting method thereof.

2. Description of the Related Art

In recent years, the number of home electronic devices corresponding to wireless Local Area Network (LAN) is being increased (hereinafter, these electronic devices are sometimes referred to as wireless LAN connectable devices). Wireless LAN connectable devices include printers and digital cameras that correspond to wireless LAN. In addition, as a broadcast content distributing system, a visual audio system that allows the user to watch and listen to television broadcasts regardless where he or she is, namely that has place shift function has been commercialized with a name of location free (registered trademark of Sony Corporation). The minimum structure of the place shift visual audio system is a base station that is a content transmitting device disposed in the user's house and a receiving device that provides a video and an audio to him or her who watches and listens to them (these devices are also referred to as a location free player or a client).

When the base station and a television antenna are connected, the user can watch and listen to a television broadcast program that is on air in any room of the house using a wireless communication function of the base station in real time. If a device such as a DVD recorder or a hard disk recorder is connected to the base station, a video and an audio reproduced by the device can be wirelessly (radio) transmitted. In addition, the television broadcast program received by the base station is converted into a digital signal. Video and audio are compressed by Moving Picture Experts Group phase 2 (MPEG2), Advanced Video Coding (AVC) (H. 264), or MPEG4 and Advanced Audio Coding (AAC), MPEG audio, or the like, respectively, in real time. The compressed data are retransmitted through the Internet. The user can watch and listen to a video and an audio with a receiving device that decompresses the received compressed data anywhere outside the house or in a foreign country.

Receiving devices include mobile devices such as portable game machines, Personal Digital Assistants (PDAs), note type personal computers (hereinafter sometimes referred to as note PCs), portable liquid crystal monitors, and portable phones (in which appropriate application software has been installed). In addition, using a receiving device that outputs received broadcast content as a video output to a television receiver, this device is called a TV box (trade name of Sony Corporation), the user can watch and listen to the broadcast program with an ordinary television receiver.

As one connection form, the base station functions as an access point and the receiving device is connected as a client (called the station) to the base station on wireless LAN. In this case, the base station is connected to the Internet through a router and a broadband modem. However, since the connection point to the Internet in the house may be apart from the base station, it may be difficult to connect them with a cable. Thus, the base station has a switch that switches the build-in LAN function from the access point to the station.

In other words, if an access point of wireless LAN has been disposed at the connection point to the Internet in the house, the base station can be newly added as a station. In this case, wireless LAN is an infrastructure. To allow a wireless LAN connectable device to radio-communicate with wireless LAN, it is necessary to perform various settings for the device. Generally, these settings include searching for Service Set Identifier (SSID) (input of an SSID character string in the case of stealth), selection of an encryption system, input of an encryption key character string). These operations are very bothersome and complicated. These information necessary for wireless LAN connection is referred to as connection setting information.

SSID is a character string that is set to each access point and that identifies a party of wireless LAN. When the same SSID is set to an access point and a station or both to stations, they can communicate with each other. SSID is standardized as Institute of Electrical and Electronics Engineers (IEEE) 802.11. IEEE 802.11 describes Wired Equivalent Privacy (WEP) as an encrypting function. As an encryption system that compensates vulnerabilities of WEP, Temporal Key Integrity Protocol has been standardized.

Japanese Patent Application Laid-Open No. 2007-36733 (Patent Document 1) describes a method of setting connection setting information of wireless LAN. In addition, Japanese Patent Application Laid-Open No. 2007-74556 (Patent Document 2) describes a simple setting method of copying connection setting information of a personal computer using a cable (eg, Universal Serial Bus (USB) cable).

SUMMARY OF THE INVENTION

The method described in Patent Document 1 is a method of allowing a station to communicate with an access point. If a new communication device (eg, base station) is allowed to communicate with wireless LAN that has been formed, it is difficult to apply this method. In other words, if a device (eg, a base station) does not have an input device (eg, keyboard, GUI), it is necessary to set connection setting information without necessity of an input device.

On the other hand, in the setting method described as Patent Document 2, since the personal computer and a wireless LAN connectable device are temporarily connected with a cable (eg, USB cable), if it is difficult to move the personal computer and the wireless LAN connectable device because of their sizes and weights, if there is no appropriate cable, or if the wireless LAN connectable device does not have a cable interface because of its cost or size, it is difficult to apply this method. In addition, it is neither direct nor easy to cause the user who uses wireless LAN to connect the personal computer and the wireless LAN connectable device with a cable even if this work is temporary.

In view of the foregoing, it would be desirable to provide a communication device, a communication system, and a communication setting method that allow setting information (eg, connection setting information for radio communication) that has been set to a communication terminal included in a radio network to be captured by a temporary radio connection with a simplified user's work that does not include a cable connection work.

According to an embodiment of the present invention, there is provided a communication device. The communication device includes a radio communication section and a switching section. The switching section switches a function between a station function and an access point function. In a state that the function of the communication device has been switched to the access point function, the communication device is connected to another communication device contained in a radio communication network through the radio communication section. The communication device receives connection setting information from the other communication device through the communication section. The connection setting information has been set to the communication section. The communication device stores the received connection setting information. After the function of the communication device has been switched from the access point function to the station function, the communication device is connected to the radio communication network containing the other communication device based on the stored connection setting information.

According to an embodiment of the present invention, there is provided a communication system. The communication system includes an access point, a first communication device, and a second communication device. A first communication device is radio-connected to the access point. A second communication device has a section which switches a function of the second communication device between a station function and an access point function. In a state that the function of the second communication device has been switched to the access point function, the first communication device is connected to the second communication device through a radio communication section. The second communication device receives connection setting information from the first communication device. The connection setting information has been set to the first communication device. The second communication device stores the received connection setting information. After the function of the second communication device has been switched from the access point function to the station function, the second communication device is connected to the radio communication network based on the stored connection setting information.

According to an embodiment of the present invention, there is provided a communication setting method of connecting a first communication device radio-connected to an access point and connecting a second communication device having a section which switches a function of the second communication device between a station function and an access point function to the access point. The function of the second communication device is switched to the access point function. The first communication device is connected to the second communication device, whose function has been switched to the access point function, through a radio communication section. The second communication device receives connection setting information from the first communication device. The connection setting information has been set to the first communication device. The second communication device store the received connection setting information. After the function of the second communication device has been switched from the access point function to the station function, the second communication device is connected to the radio communication network based on the stored connection setting information.

According to an embodiment of the present invention, the communication device whose function is switched from the access point function and the station function does not have an input device.

According to an embodiment of the present invention, when the communication device is connected to the radio communication network, the communication device checks whether or not it has been correctly connected to the radio communication network.

According to an embodiment of the present invention, the function of the communication device is returned from the access point function to the station function after the communication device has received a restart request or a predetermined time has elapsed.

According to an embodiment of the present invention, a wireless LAN connectable device is temporarily switched to an access point state. Connection setting information that has been set to a station connected to a radio network is directly captured from the station. The wireless LAN connectable device can communicate with the radio network based on the setting information. Thus, according to an embodiment of the present invention, the user can easily set connection setting information for radio communication without necessity of a cable.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
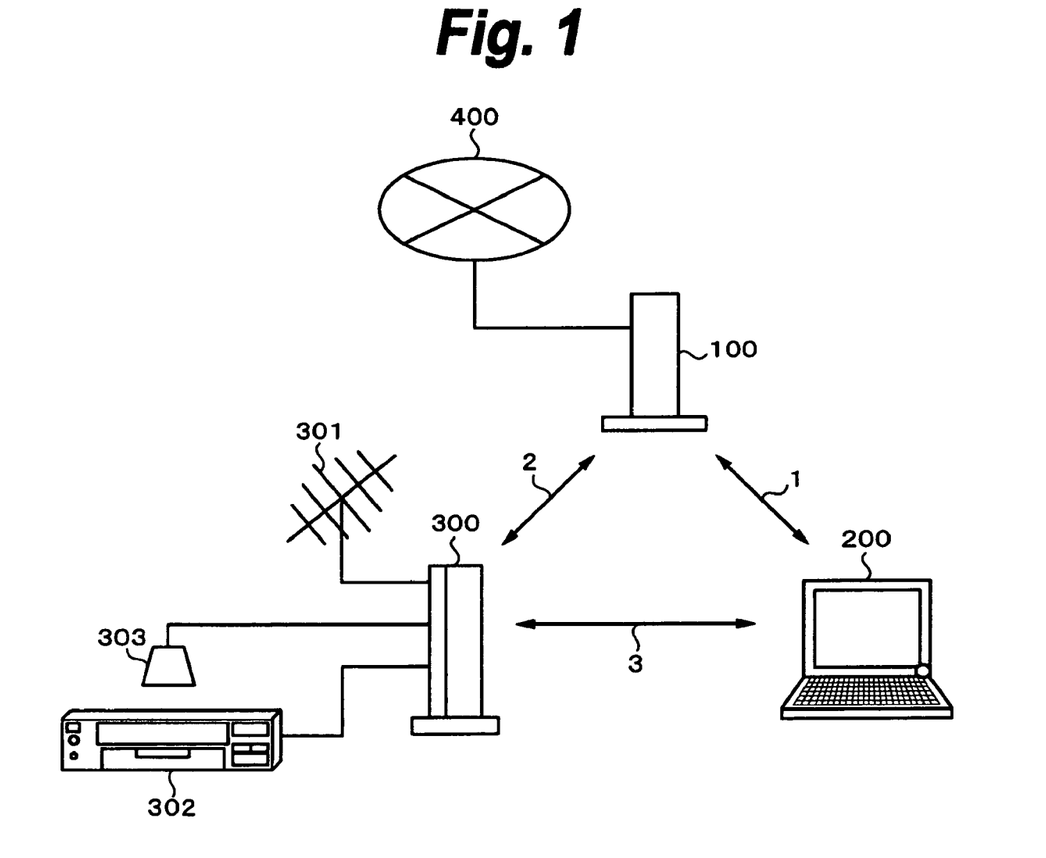
FIG. 1 is a block diagram showing an overall structure of a content receiving system according to an embodiment of the present invention.

Next, with reference to the accompanying drawings, embodiments of the present invention will be described. FIG. 1 shows an overall structure of a radio communication system according to an embodiment of the present invention. First, the relationship between communication systems set forth in the claims and the radio communication system shown in FIG. 1 will be described. An access point set forth in the claims corresponds to an access point 100 connected to the Internet 400. A first communication device radio-connected to the access point of the claims corresponds to a note PC 200. A second communication device having means for switching a function between a station function and an access point function of the claims corresponds to a base station 300. In the state that the base station 300 has been switched to the access point function, the note PC 200 is connected to the base station 300 through radio communication means. The base station 300 receives connection setting information that has been set to the note PC 200. The base station 300 stores the received connection setting information. After the base station 300 has been switched from the access point function to the station function, the base station 300 is connected to the access point 100 based on the connection setting information that has been stored.

Although the base station 300 has neither an input device, nor a GUI, connection setting information necessary for connecting the base station 300 to the access point 100 on wireless LAN can be set to the base station 300 without necessity of a cable connected between the base station 300 and the note PC 200.

Next, an embodiment of the present invention will be described. As indicated by arrow 1, a personal computer (eg, note PC 200) is connected, for example, to the access point 100 in the house by radio communication. In addition, as indicated by arrow 2, the base station 300 that is location free is connected to the access point 100 by radio communication. By installing software called location free player in the note PC 200, it functions as a receiving device for the base station 300.

Connected to the base station 300 is a television antenna 301 such that the base station 300 can receive television broadcasts (eg, analog television broadcasts). Television broadcasts that the base station 300 may receive as broadcast content include satellite digital broadcasts, terrestrial digital broadcasts, cable television broadcasts, and Internet television broadcasts besides analog television broadcasts.

Connected also to the base station 300 is a recorder 302 as an external device. The recorder 302 uses a record medium, examples of which include a hard disk, a semiconductor memory, and an optical disc, and can record a broadcast program of a user's desired channel and reproduce it and a recorded video material.

The note PC 200 that functions as a receiving device can remotely control selecting of a broadcast program of a channel that the base station 300 transmits and recording/reproducing operations and channel selecting operation of the base station 300. Connected to the base station 300 is for example an AV mouse 303. The note PC 200 can remotely control the operation of the recorder 302 through the AV mouse 303. If a display device instead of the recorder 302 is connected to the base station 300, the user can watch and listen to a video and an audio reproduced by the recorder 302 on the display device.

In the house, the user can watch and listen to content of a television broadcast received and demodulated by the base station 300 or content reproduced from the recorder 302 with the note PC 200 through wireless LAN paths indicated by arrows 1 and 2. To allow the user to watch and listen to the broadcast content in a foreign country, the broadcast content is compression-encoded and transmitted to the Internet 400 through the access point 100. To use the access point 100, it is necessary for the user to have a subscription contact with an Internet service provider (ISP). A global IP address of the ISP is assigned to the access point 100. To allow the user to receive a television broadcast in a foreign country in real time, a TV box is used.

Figure 2:
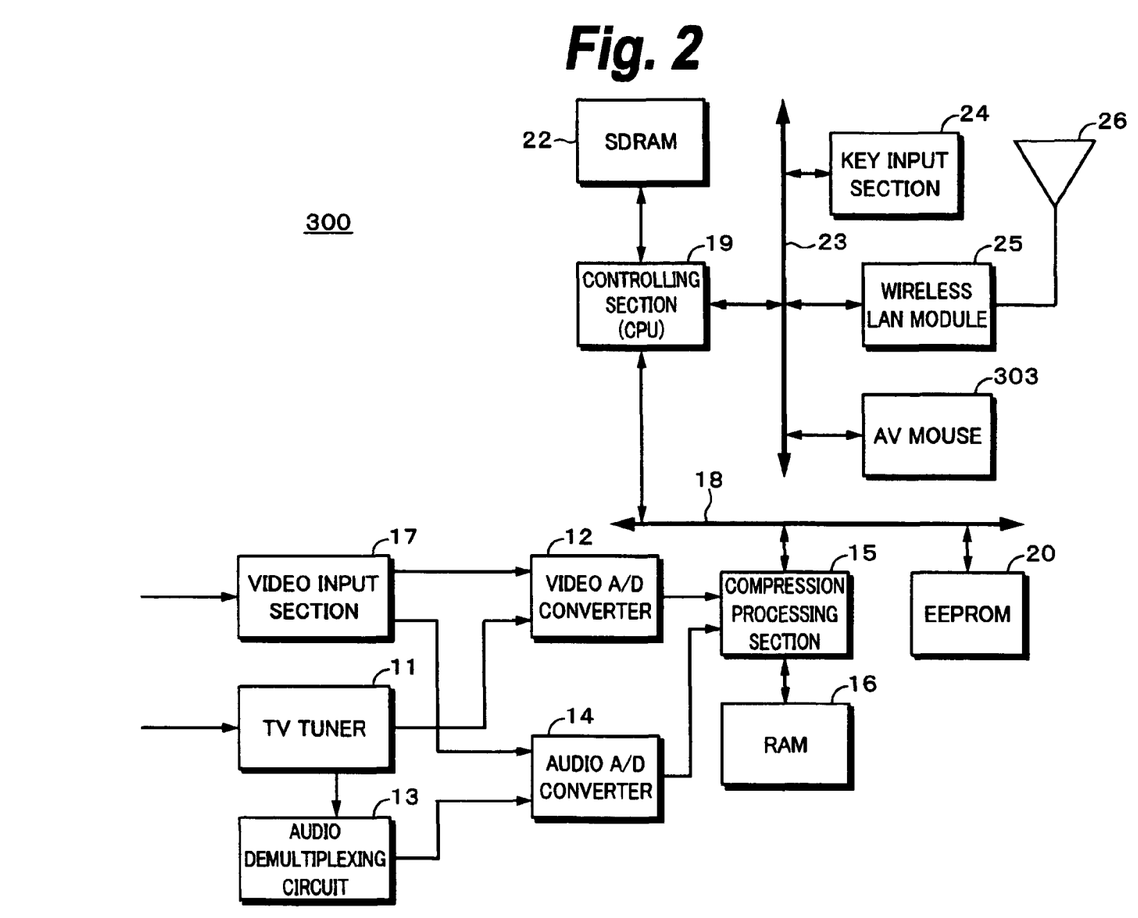
FIG. 2 is a block diagram showing a structure of a base station according to an embodiment of the present invention.

Next, with reference to FIG. 2, an exemplary structure of the base station 300 will be described. A television signal received by the television antenna 301 is supplied to a tuner 11. An example of the tuner 11 is an analog television tuner. The tuner 11 demodulates the television signal into a video signal. The video signal is converted into a digital video signal by a video A/D converter 12. An audio intermediate frequency signal extracted from the tuner 11 is supplied to an audio demultiplexing circuit 13. The audio demultiplexing circuit 13 demodulates the audio intermediate frequency signal into an analog audio signal. The analog audio signal is converted into a digital audio signal by an audio A/D converter 14.

The digital video signal and the digital audio signal are supplied to a compression processing section 15. The compression processing section 15 performs a compression-encoding process for the digital video signal and the digital audio signal. Examples of compression-encoding include MPEG2, MPEG4, Advanced Video Coding (AVC), AAC, MPEG audio, and VC-1. Connected to the compression processing section 15 is a RAM 16 with which a compressing process is performed.

The base station 300 has a composite video (or component video) input section 17 through which an analog video signal can be input from the external recorder 302. Besides the recorder 302, a video signal can be input from a Communication Satellite (CS) tuner, a cable television (CATV) tuner, a digital terrestrial wave tuner, an imaging device, a Digital Versatile Disc (DVD) player, or a video deck to the base station 300.

The video signal supplied from the video input section 17 is converted into a digital video signal by the video A/D converter 12. The analog audio signal supplied from the video input section 17 is converted into a digital audio signal by the audio A/D converter 14. The digital video signal and the digital audio signal are compression-encoded by the compression-processing section 15.

Compressed data that are output from the compression processing section 15 is supplied to a local bus 18. Connected to the local bus 18 are a controlling section 19 and an Electrical Erasable Programmable ROM (EEPROM) 20 that is a nonvolatile memory.

The EEPROM 20 stores, for example, wireless LAN connection setting information (ie, information of an SSID character string, an encryption system, an encryption key character string of the access point 100). In addition, the EEPROM 20 stores information of a broadcast channel that has been selected immediately before the main power of the base station 300 is turned off. After the main power of the base station 300 is turned on, the broadcast signal of the channel that had been selected immediately before the power was turned off can be selected. In addition, the EEPROM 20 stores data with respect to the remote controller, the data having been distributed from a predetermined site on the Internet.

Compression-encoded data that are output from the compression processing section 15 are supplied to the controlling section 19 through the local bus 18. The controlling section 19 is composed of a Central Processing Unit (CPU), a Read Only Memory (ROM) that stores a control program, and a Random Access Memory (RAM) that stores various types of data. Connected also to the controlling section 19 is a Synchronous Dynamic Random Access Memory (SDRAM). If necessary, the controlling section 19 reads a program and data from the ROM and controls each section of the base station 300 with the RAM used as a work memory.

Connected to a CPU bus 23 of the CPU of the controlling section 19 are a key input section 24 (composed of a power switch, a registration mode switch, and so forth), a wireless LAN module 25, and the AV mouse 303. Connected to the wireless LAN module 25 is an antenna 26. The wireless LAN module 25 includes a transmitting section and a receiving section. The wireless LAN module 25 performs a transmitting process and a receiving process based on a predetermined communication protocol. The wireless LAN module 25 of the base station 300 corresponds, for example, to three standards of IEEE 802.11b/g/a as wireless LAN systems. Supplied to the AV mouse 303 is a remote control signal received by the wireless LAN module 25. The operation of the recorder 302 is controlled through the AV mouse 303.

If the registration mode switch is pressed, as will be described later, the base station 300 operates in the access point mode for a predetermined time (eg, 5 minutes). After a predetermined time has elapsed, or if the base station 300 is restarted, it returns to the station mode. In the access point mode, the base station 300 operates on the basis of a fixed SSID including a predetermined character string (eg, "LocationFree"), a fixed encryption system (eg, WEP 64 bits), and an encryption key character string calculated from the SSID by a predetermined calculation formula (eg, hash function).

Compression-encoded data compressed by the compression processing section 15 of the base station 300 are a television signal that is output from the tuner 11 or a video signal that is supplied to the video input section 17. The compression-encoded data are transmitted to the access point 100 through the wireless LAN module 25 and a signal transmitted from the access point 100 is received by the note PC 200. As a result, the user can watch and listen to a program of a television broadcast with the note PC 200 disposed in a room other than that for the base station 300 in the same house. On the other hand, the base station 300 receives a control signal (eg, channel selection command) from the receiving device through the wireless LAN module 25 and supplies the received control signal to the controlling section 19. The recorder 302 is controlled through the AV mouse 303.

In the foregoing base station 300, the controlling section 19 selects one of the output signal of the tuner 11 and the video signal from the video input section 17. In addition, the controlling section 19 selects a channel from the output signal of the tuner 11. The broadcast signal of the selected channel or the video signal is compression-encoded by the compression processing section 15. The compression-encoded data are transmitted through the controlling section 19, the wireless LAN module 25, and the antenna 26. As a result, the user can watch and listen to a television broadcast or a video of the video signal with the note PC 200 on wireless LAN.

Figure 3:
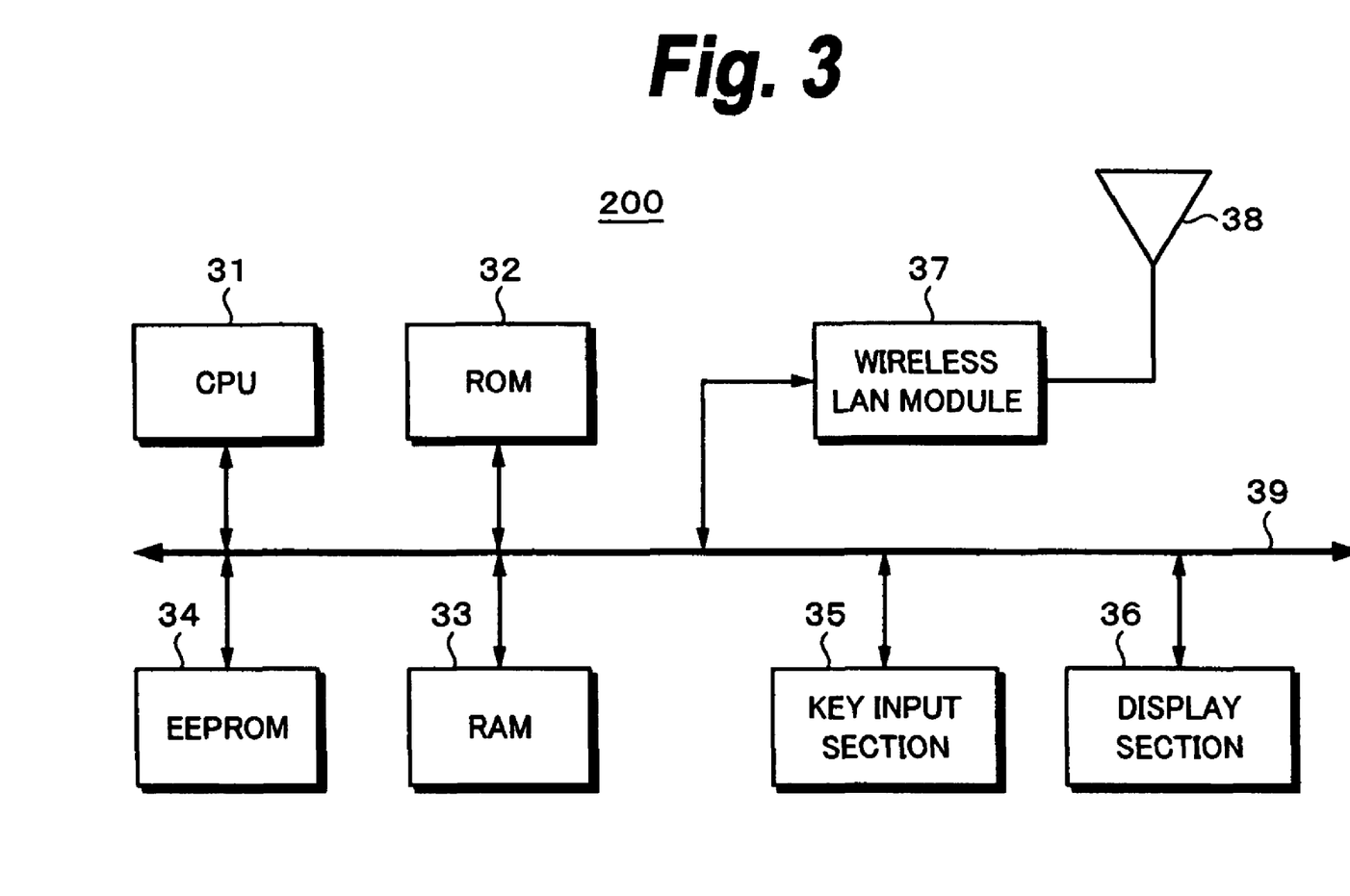
FIG. 3 is a block diagram showing a structure of a note PC according to an embodiment of the present invention.

Next, with reference to FIG. 3, the note PC 200 that functions as a receiving device will be described. As shown in FIG. 3, the note PC 200 has a CPU 31, a ROM 32 that stores a program (eg, software for a player), a RAM 33 that functions as a work memory of the CPU 31, an EEPROM 34 that stores setting information of wireless LAN, a key input section 35 that is composed of a keyboard and a key detecting section, a display section 36 that is composed of a display controlling section and a liquid crystal display, a wireless LAN module 37, and an antenna 38. These structural elements are mutually connected to each other through a bus 39. Like the wireless LAN module 25 of the base station 300, the wireless LAN module 37 of the note PC 200 corresponds to three standards of IEEE 802.11b/g/a.

The note PC 200 receives compression-encoded data from the base station 300 through the access point 100. The compression-encoded data are data of which a television signal of a channel selected by the tuner 11 of the base station 300 or data of which a video signal supplied to the video input section 17 has been compression-encoded. The compression-encoded data received by the wireless LAN module 37 are decompressed by a software process and output and reproduced through a D/A converter (not shown). Thus, the user can watch and listen to a program of a television broadcast and a video and an audio reproduced by the recorder 302 with the note PC 200 that functions as a receiving device in a room other than that for the base station 300, for example, in the house.

According to this embodiment of the present invention, in the state that the note PC 200 is radio-communicating through the access point 100, if the base station 300 is added to wireless LAN, connection setting information for radio communication with the access point 100 is set to the base station 300. In this case, with the connecting setting information that has been set to the note PC 200 for wireless LAN connected to the access point 100, the connection setting information is obtained from the note PC 200 on wireless LAN. As a result, the base station 300 is connected to the access point 100 on wireless LAN.

Next, with reference to a sequence diagram shown in FIG. 4, processes of setting connection setting information to the base station 300 will be described in a time sequence. The relationship between a communication setting method as set forth in the claims and the processes shown in FIG. 4 is as follows.

A communication setting method of connecting a base station 300 to an access point 100 includes
step S2 of switching the function of the base station 300 to the access point function;
step S9 of connecting the note PC 200 to the base station 300, whose function has been switched to the access point function, through radio communication means,
step S11 of causing the base station 300 to receive connection setting information from the note PC 200, the connection setting information having been set to the note PC 200, and storing the received connection setting information, and
step S14 of connecting the base station 300 to the radio communication network based on the stored connection setting information after the function of the base station 300 has been switched from the access point function to the station function.

Figure 4:
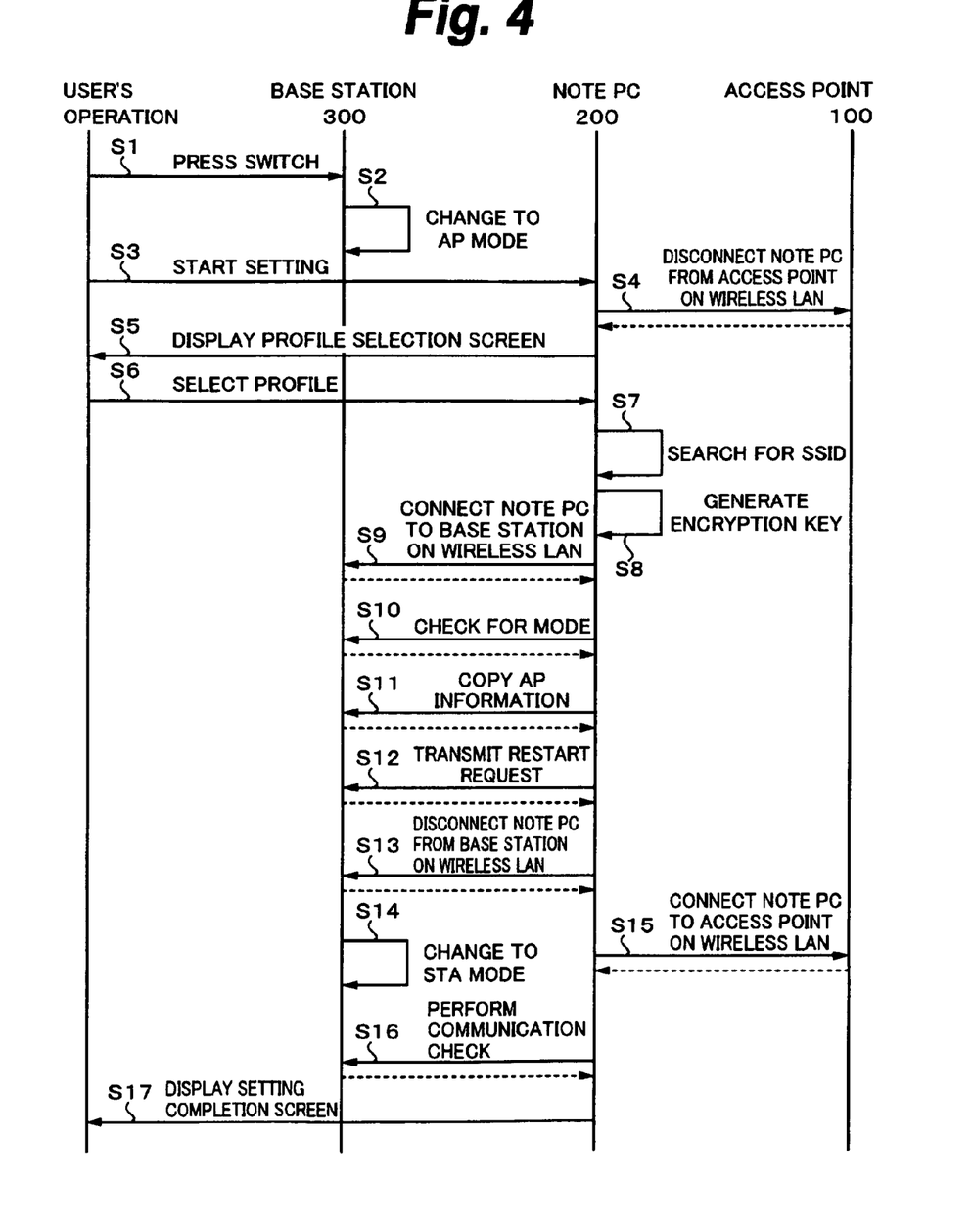
FIG. 4 is a block diagram showing a flow of processes of setting connection setting information according to an embodiment of the present invention.
Figure 5:
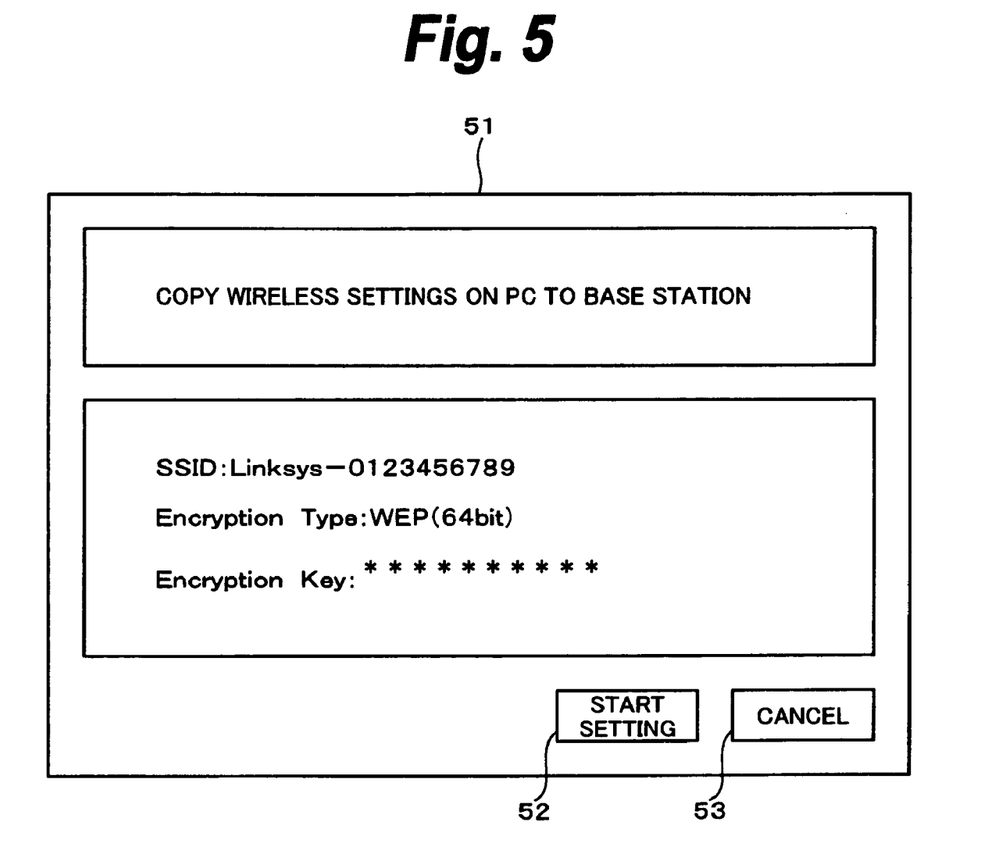
FIG. 5 is a schematic diagram showing an example of an operation screen according to an embodiment of the present invention.
Figure 6:
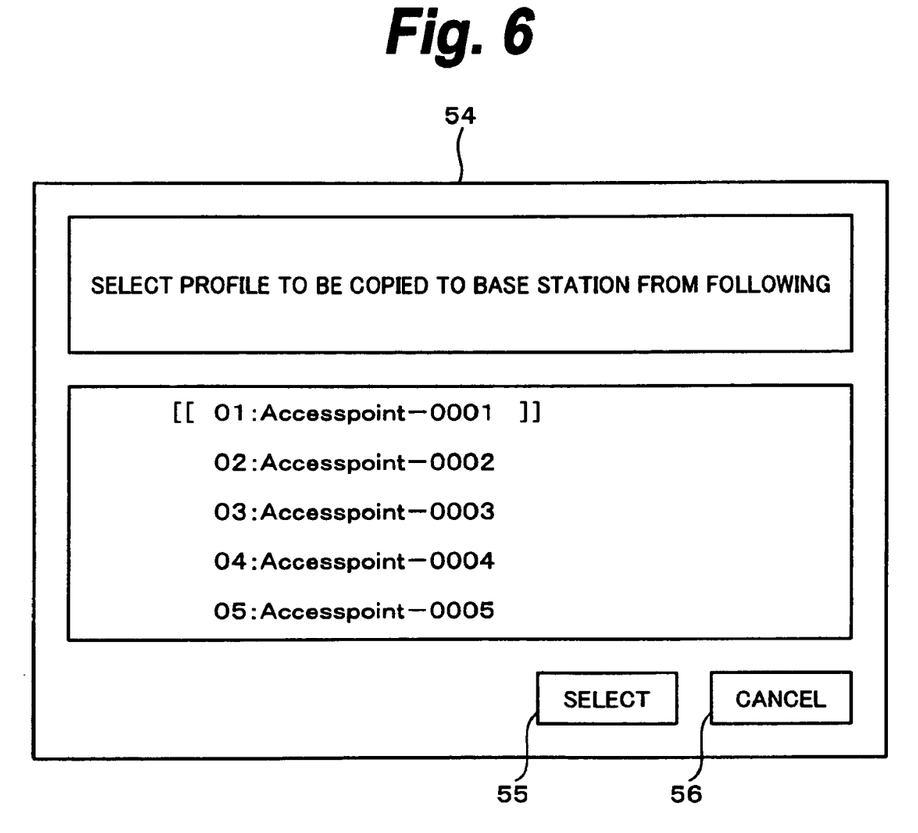
FIG. 6 is a schematic diagram showing an example of an operation screen according to an embodiment of the present invention.

In FIG. 4, dotted arrows opposite to solid arrows represent processes response to actions. FIG. 5 and FIG. 6 show exemplary screens displayed on the display section 36 of the note PC 200.

At step S1, the user presses the registration mode switch on the base station 300. When the registration mode switch is pressed, the base station 300 changes to the access point mode (at step S2). In the access point mode, the base station 300 operates on the basis of a fixed SSID including a predetermined character string (eg, LocationFree), a fixed encryption system (eg, WEP 64 bits), and an encryption key character string calculated from the SSID by a predetermined calculation formula (eg, hash function). The SSID, the encryption system, and the calculation formula have been set to the base station 300. The SSID, WEP, encryption key, and so forth are indicated at a part of the case of the device.

As shown in FIG. 5, the display section of the note PC 200 displays a setting start screen 51. The setting start screen 51 indicates connection setting information (ie, SSID, encryption system, encryption key) with which the note PC 200 and the access point 100 are connected on wireless LAN. In addition, the setting start screen 51 indicates a setting start button 52 and a cancel button 53.

At step S3, the user clicks the setting start button 52 on the setting start screen 51, for example, with a mouse. Thereafter, the note PC 200 stores information necessary for connecting itself to the access point 100 on wireless LAN to the EEPROM 34 that is a nonvolatile memory. Thereafter, the flow advances to step S4. At step S4, the note PC 200 is disconnected from the access point 100 on wireless LAN.

If the note PC 200 has not been connected to any access point when the setting is started, as shown in FIG. 6, the note PC 200 displays a profile selection screen 54 as a GUI (at step S5). At step S6, the user selects a desired wireless profile (eg, "01: Accesspoint-001") from those that are being displayed and then presses a selection button 55 to confirm the selected wireless profile (at step S6). The profile selection screen 54 also indicates a cancel button 56. If the user clicks the cancel button 56 with the mouse, he or she can cancel the processes. A plurality of wireless profiles indicated on the profile selection screen 54 are connection information of access points to which the note PC 200 has been connected.

Thereafter, at step S7, the note PC 200 searches for the SSID of the base station 300 that is operating in the access point mode, extracts the SSID that contains a predetermined character string (eg, LocationFree) from an obtained list, and creates an SSID list. At step S8, encryption key character strings of the individual SSIDs of the SSID list are generated by a predetermined calculation formula (eg, hash function). This calculation formula is shared only by the note PC 200 and the base station 300. Instead, the user may input an SSID and an encryption key character string with the keyboard of the note PC 200.

The note PC 200 tires to connect itself to access points with generated encryption keys of the individual items of the extracted SSID list (at step S9). If the note PC 200 has succeeded in connecting itself to an access point, the flow advances to step S10. At step S10, it is checked whether or not the connected access point is a base station on which the registration mode switch has been pressed. In other words, it is checked whether or not the SSID of the note PC 200 is the same as that of the access point, namely to check whether or not the note PC 200 is being connected to an irrelevant access point. For example, the note PC 200 transmits a broadcast packet to the base station 300 and checks for it based on response information received therefrom.

Instead, assuming that only one base station 300 operates as an access point, an encryption key may be generated based on the obtained SSID and the base station 300 and the note PC 200 may be connected based on the generated encryption key on wireless LAN. In this case, the mode confirmation process at step S10 is not performed.

If the checked result at step S10 denotes that the connected base station is one on which the registration mode switch has been pressed, the flow advances to step S11. At step S11, the note PC 200 transmits connection setting information (ie, SSID and encryption key) necessary for wireless LAN connection with the access point 100 to the base station 300 and stores the received connection setting information to a nonvolatile memory (EEPROM 20).

At step S12, the note PC 200 transmits a restart request to the base station 300. When the base station 300 receives the restart request, it performs a restart process. At step S13, after the note PC 200 has transmitted the restart request to the base station 300, the note PC 200 disconnects itself from the base station 300 on wireless LAN. Instead of the restart request, the base station 300 may restart by a timer operation.

After the base station 300 has restarted, it changes from the access point mode to the station mode and connects itself to the access point 100 based on the connection setting information stored in the nonvolatile memory on wireless LAN (at step S14). Thereafter, the note PC 200 connects itself to the access point 100 on wireless LAN (at step S15). At step S16, the note PC 200 performs communication check through the access point 100 (at step S16). When the result of the communication check is correct (at step S16), the flow advances to step S17. At step S17, the note PC 200 displays a setting completion screen that informs the user that the setting has been complete. For example, the note PC 200 transmits a broadcast packet. When the note PC 200 has received a response from the base station 300, the note PC 200 determines that it has succeeded in connecting itself to the access point 100.

Although embodiments of the present invention have been described, it should be understood by those skilled in the art that various modifications, combinations, sub-combinations and alternations may occur depending on design requirements and other factors insofar as they are within the scope of the appended claims or the equivalents thereof. For example, license information, user registration information, or the like of a web service besides setting information of radio communication may be copied from a device having an input device and a display device to a device that does have them. In addition, the foregoing GUI screens are exemplary. Thus, other screens may be used.

What is claimed is:

1. A communication device, comprising:
   radio communication means; and
   means for switching a function between a station function and an access point function;
   wherein in a state that the function of the communication device, responsive to a user input operation on the communication device, has been switched to the access point function, the communication device is connected to another communication device contained in a radio communication network through the radio communication means,
   the communication device receives connection setting information from the other communication device through the radio communication means, the connection setting information having been set thereto and a user input operation at the other communication device causing the communication device to receive the connection setting information,
   the communication device stores the received connection setting information, and
   after the function of the communication device has been switched from the access point function to the station function, the communication device is connected to an access point which is different and separate from the other communication device based on the stored connection setting information,
   such that the communication device is connectable to the access point based on the connection setting information stored in the communication device which was provided from the other communication device without using a cable connection between the communication device and the other communication device.

2. The communication device as set forth in claim 1, wherein the communication device does not have an input device.

3. The communication device as set forth in claim 1, wherein when the communication device is connected to the radio communication network containing the other communication device based on the stored connection setting information, the communication device checks whether or not the communication device has been correctly connected to the radio communication network.

4. The communication device as set forth in claim 1, wherein the state in which the function of the communication device has been switched to the access point function is returned to the station function when the communication device receives a restart request from the other communication device.

5. The communication device as set forth in claim 1, wherein after the function of the communication device has been switched to the access point function and a predetermined time has elapsed, the function of the communication device is returned to the station function.

6. A communication system, comprising:
an access point;
a first communication device in a radio communication network radio-connected to the access point; and
a second communication device having means for switching a function of the second communication device between a station function and an access point function,
wherein in a state that the function of the second communication device, responsive to a user input operation on the second communication device, has been switched to the access point function, the first communication device is connected to the second communication device through radio communication means,
the second communication device receives connection setting information from the first communication device, the connection setting information having been set to the first communication device and a user input operation at the first communication device causing the second communication device to receive the connection setting information, and stores the received connection setting information, and
after the function of the second communication device has been switched from the access point function to the station function, the second communication device is connected to the access point based on the stored connection setting information,
such that the second communication device is connectable to the access point based on the connection setting information stored in the second communication device which was provided from the first communication device without using a cable connection between the first communication device and the second communication device.

7. The communication system as set forth in claim 6, wherein the second communication device does not have an input device.

8. The communication system as set forth in claim 6, wherein when the second communication device is connected to the radio communication network based on the stored connection setting information, it is checked whether or not the second communication device has been correctly connected to the radio communication network.

9. The communication system as set forth in claim 6, wherein the state in which the function of the second communication device has been switched to the access point function is returned to the station function when the second communication device receives a restart request from the first communication device.

10. The communication system as set forth in claim 6, wherein after the function of the second communication device has been switched to the access point function and a predetermined time has elapsed, the function of the second communication device is returned to the station function.

11. A communication setting method of connecting a first communication device in a radio communication network radio-connected to an access point and connecting a second communication device having means for switching a function of the second communication device between a station function and an access point function to the access point, comprising the steps of:

switching the function of the second communication device to the access point function;
connecting the first communication device to the second communication device, whose function, responsive to a user input operation on the second communication device, has been switched to the access point function, through radio communication means,
causing the second communication device to receive connection setting information from the first communication device, the connection setting information having been set to the first communication device and a user input operation at the first communication device causing the second communication device to receive the connection setting information, and store the received connection setting information, and
after the function of the second communication device has been switched from the access point function to the station function, connecting the second communication device to the access point based on the stored connection setting information,
such that the second communication device is connectable to the access point based on the connection setting information stored in the second communication device which was provided from the first communication device without using a cable connection between the first communication device and the second communication device.

12. The communication setting method as set forth in claim 11, wherein the second communication device does not have an input device.

13. The communication setting method as set forth in claim 11 wherein when the second communication device is connected to the radio communication network based on the stored connection setting information, it is checked whether or not the second communication device has been correctly connected to the radio communication network.

14. The communication setting method as set forth in claim 11, wherein the state in which the function of the second communication device has been switched to the access point function is returned to the station function when the second communication device receives a restart request from the first communication device.

15. The communication setting method as set forth in claim 11, wherein after the function of the second communication device has been switched to the access point function and a predetermined time has elapsed, the function of the second communication device is returned to the station function.

16. A communication device, comprising:
a radio communication section; and
a switching section which switches a function between a station function and an access point function;
wherein in a state that the function of the communication device, responsive to a user input operation on the communication device, has been switched to the access point function, the communication device is connected to another communication device contained in a radio communication network through the radio communication section,
the communication device receives connection setting information from the other communication device through the radio communication section, the connection setting information having been set thereto and a user input operation at the other communication device causing the communication device to receive the connection setting information, the communication device stores the received connection setting information, and after the function of the communication device has been switched from the access point function to the station function, the communication device is connected to an access point which is different and separate from the other communication device based on the stored connection setting information, such that the communication device is connectable to the access point based on the connection setting information stored in the communication device which was provided from the other communication device without using a cable connection between the communication device and the other communication device.

* * * * *